(12) United States Patent
Bar et al.

(10) Patent No.: US 9,635,491 B2
(45) Date of Patent: Apr. 25, 2017

(54) TRANSIENT MOBILE APPLICATION CAPTURE IN A RESTRICTED AREA

(71) Applicant: SAP SE, Walldorf (DE)

(72) Inventors: Pascal Bar, Mouen (FR); Jean-Nicolas Des Pommare, Bretteville sur Odon (FR); Mehdi Jouan, Fontenay le Marmion (FR); Sebastien Savalle, Hérouville Saint Clair (FR)

(73) Assignee: SAP SE, Walldorf (DE)

( * ) Notice: Subject to any disclaimer, the term of this patent is extended or adjusted under 35 U.S.C. 154(b) by 64 days.

(21) Appl. No.: 14/328,389

(22) Filed: Jul. 10, 2014

(65) Prior Publication Data
US 2016/0014660 A1 Jan. 14, 2016

(51) Int. Cl.
| | | |
|---|---|---|
| *H04W 36/00* | (2009.01) | |
| *G06F 7/04* | (2006.01) | |
| *G06F 15/16* | (2006.01) | |
| *G06F 17/30* | (2006.01) | |
| *H04L 29/06* | (2006.01) | |
| *H04W 4/00* | (2009.01) | |
| *H04W 12/00* | (2009.01) | |
| *H04W 12/04* | (2009.01) | |
| *H04W 12/08* | (2009.01) | |
| *H04W 84/12* | (2009.01) | |

(52) U.S. Cl.
CPC .......... *H04W 4/008* (2013.01); *H04W 12/00* (2013.01); *H04W 12/04* (2013.01); *H04W 12/08* (2013.01); *H04W 84/12* (2013.01)

(58) Field of Classification Search
CPC ..... H04W 4/021; H04W 4/025; H04W 12/06; H04W 12/08; H04W 48/08
USPC ...... 455/410, 411, 456.1; 370/901, 912, 913
See application file for complete search history.

(56) References Cited

U.S. PATENT DOCUMENTS

| | | | |
|---|---|---|---|
| 7,283,846 B2 | 10/2007 | Spriestersbach et al. | |
| 8,358,640 B1* | 1/2013 | Breau | H04W 84/045 370/252 |
| 8,527,348 B2 | 9/2013 | Petrov | |
| 8,594,649 B2 | 11/2013 | Kwon et al. | |
| 2001/0037469 A1* | 11/2001 | Gupta | G06F 21/33 726/2 |

(Continued)

OTHER PUBLICATIONS

NFC Forum, Connection Handover Technical Specification, Connection Handover 1.2, Jul. 7, 2010.*

*Primary Examiner* — Rafael Pérez-Gutiérrez
*Assistant Examiner* — Mark G. Pannell
(74) *Attorney, Agent, or Firm* — Jones Day

(57) ABSTRACT

Embodiments of the present disclosure include a system that may allow a mobile device to access a transient mobile application while the user is in a restricted area. The system may include a mobile device, a handover device, a network, a captive portal server, and an application server. The mobile device may interact with a handover device to automatically connect to the network. Once connected to the network, the captive portal server may connect the mobile device to a captive portal. The mobile device may then automatically launch a browser and be redirected to a web address of a transient mobile application. The user may interact with the application while the user is connected to the network and within a restricted area. Once the user leaves the restricted area, he/she may no longer have access to the transient mobile application.

12 Claims, 5 Drawing Sheets

(56) References Cited

U.S. PATENT DOCUMENTS

| | | | |
|---|---|---|---|
| 2005/0102529 A1* | 5/2005 | Buddhikot | H04L 63/02 726/26 |
| 2006/0031830 A1* | 2/2006 | Chu | G06F 21/10 717/174 |
| 2006/0190410 A1* | 8/2006 | Harper | G06F 21/10 705/59 |
| 2007/0123297 A1 | 5/2007 | Chan et al. | |
| 2007/0208864 A1* | 9/2007 | Flynn | H04L 63/02 709/227 |
| 2010/0120402 A1 | 5/2010 | Sethi et al. | |
| 2011/0106635 A1 | 5/2011 | Khan et al. | |
| 2011/0276961 A1 | 11/2011 | Johansson et al. | |
| 2011/0320293 A1 | 12/2011 | Khan | |
| 2013/0198383 A1* | 8/2013 | Tseng | H04L 63/102 709/225 |
| 2013/0282421 A1 | 10/2013 | Graff et al. | |
| 2014/0068705 A1* | 3/2014 | Chambers | H04L 63/08 726/1 |
| 2014/0137225 A1* | 5/2014 | Chickering | G06F 21/00 726/8 |
| 2014/0208397 A1* | 7/2014 | Peterson | G06F 21/00 726/4 |
| 2014/0266585 A1* | 9/2014 | Chao | G07C 9/00111 340/5.61 |
| 2014/0351917 A1* | 11/2014 | Chickering | H04L 63/02 726/11 |
| 2015/0288670 A1* | 10/2015 | Bhooshan | H04L 63/08 726/7 |
| 2015/0304920 A1* | 10/2015 | Cootey | H04W 28/18 455/436 |

\* cited by examiner

100

TRANSIENT MOBILE APPLICATION CAPTURE IN A RESTRICTED AREA

BACKGROUND

The present invention relates techniques to access and use mobile applications (or "apps") on mobile devices.

With the boom of mobile apps now available on multiple app stores, smartphone users are more and more reluctant to install new applications on their device especially if they know that they will use this application in a temporary manner. For example, an average of twenty-six mobile apps are downloaded onto each smartphone worldwide. In industrialized countries, the number of downloaded apps per smartphone approaches fifty. There are several problems associated with downloading an increasing amount of mobile applications.

For example, the process of searching for the right application for a service that will be used sparingly is complex and boring for the user of the mobile device. Moreover, when the users are in front of the service, downloading and installing a mobile application can take time and is not always possible (mobile network availability/speed, application configuration, etc.). This is particularly true when this service is restricted to a particular place and making the application accessible on a worldwide app store is unnecessary.

On the other hand, more and more service providers and retailers base their business and their achievement on their mobile app acceptance rate. Then, the challenge for them is to deploy their mobile app on a maximum of customer mobiles. So if an application is required to be installed on the device before accessing a desired service, the service provider will have to make a costly promotion for motivating the clients to install the app in advance. At last, for the above reasons, if the service is attached to a given place, this will be even more difficult for the service provider to convince the customer to anticipate the downloading of the application.

Another strategy for the service providers and retailers should be to use preinstalled/horizontal applications that are natively installed on customer's mobile. This approach is interesting if the functional scope proposed by this common app is able to fit the service provider requirements. By example, with the iPhone, the service could be interested in using the Passbook app for storing a loyalty card identification ("ID"). But with this application, the service provider knows that the user experience is standardized and is the same for all service providers.

DETAILED DESCRIPTION

Embodiments of the present disclosure include a system that may allow a mobile device to access a transient mobile application while a user is in a restricted area. The system may include a mobile device, a handover device, a network, a captive portal server, and an application server. The mobile device may interact with a handover device to automatically connect to the network. Once connected to the network, the captive portal server may connect the mobile device to a captive portal. The mobile device may then automatically launch a browser and be redirected to a web address of a transient mobile application. The user may interact with the application while the user is connected to the network and within a restricted area. Once the user leaves the restricted area, he/she may no longer have access to the transient mobile application.

Figure 1:
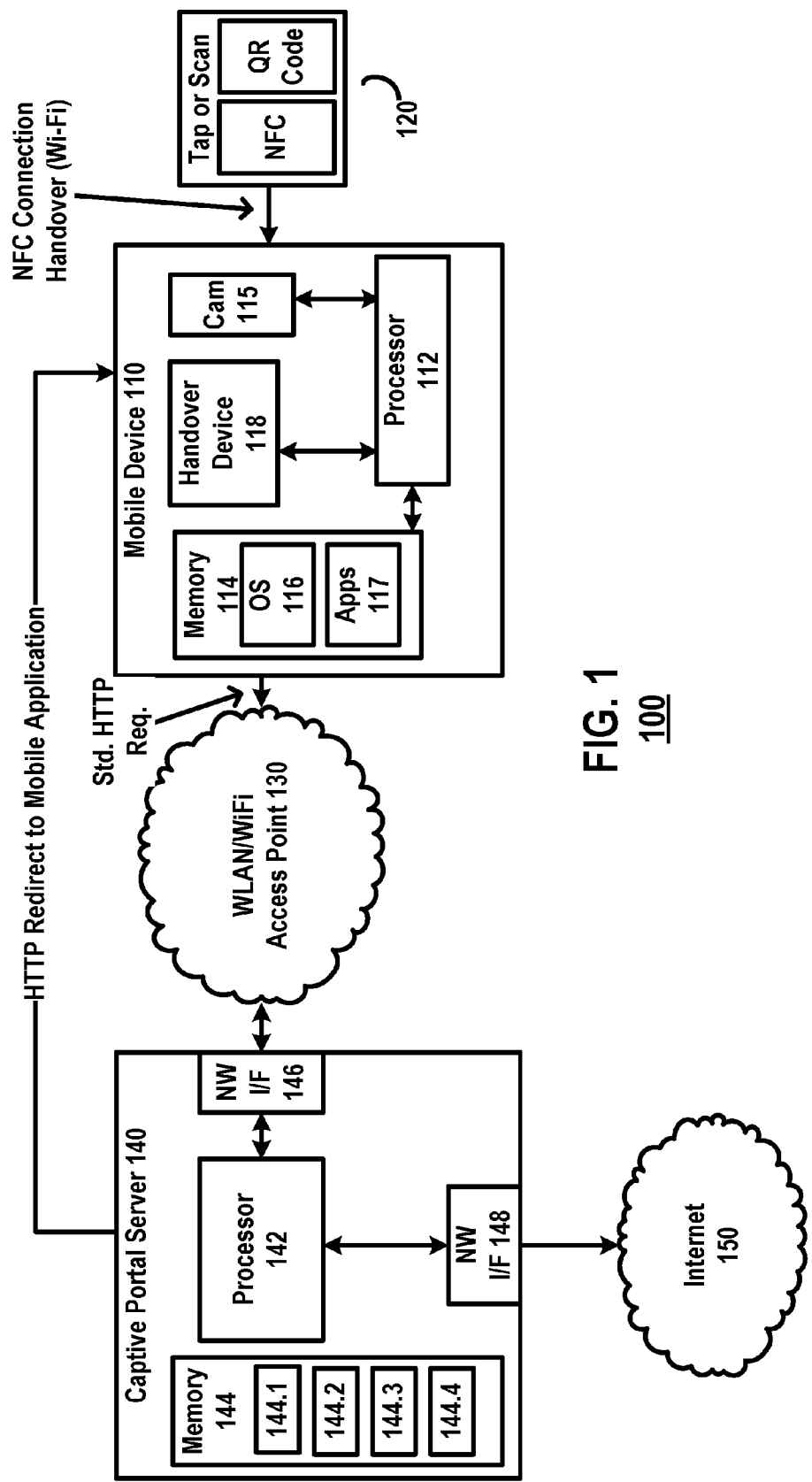
FIG. 1 is a block diagram of a system according to an embodiment of the present disclosure.

FIG. 1 is simplified block diagram of a system 100 according to an embodiment of the present disclosure. The system 100 may include a mobile device 110, handover device/element 120, a wireless local area (WLAN)/Wi-Fi access point 130, a captive portal server 140, and the Internet 150. The mobile device 110 may communicate with the handover device 120 and the WLAN 130. Captive portal server 140 may be coupled to the WLAN 130 and the Internet 150 and may act as a specialized gateway (as described in more detail below and with respect to FIGS. 2-4).

The mobile device 110 may be a smart phone, a laptop, a tablet, or the like. The mobile device 110 may include a processor 112, a memory device 114, and a near field communication device (NFC) 118. The processor 112 may be provided in various configurations, such as a central processing unit ("CPU"), a field-programmable gate array ("FPGA"), an application specific integrated circuit ("ASIC"), or any other suitable logic device or combination of logic devices. The memory 114 may include a machine readable medium which may include volatile memory (such as DRAM, SRAM, or the like) and non-volatile memory (such as ROM, RLASH, EEPROM, or the like). The memory 114 may store processor-executable instructions such as operating system software 116 and software applications 117. One of the software applications may be a quick response (QR) code scanning application, for example. The mobile device may optionally include a camera 115 which may be used to read a QR code (described in more detail below).

The NFC device 118 may be a NFC chip capable for use as a short-range communication device which may utilize radio frequency identification (RFID) technology to communicate with other NFC devices or to receive data from NFC tags. The NFC device 118 may include a transceiver (not shown) to transmit data and a receiver (not shown) to receive data. The mobile device may also include a Bluetooth chip to allow the mobile device 110 to pair with other Bluetooth device or to received/transmit data via Bluetooth technology.

Figure 5:
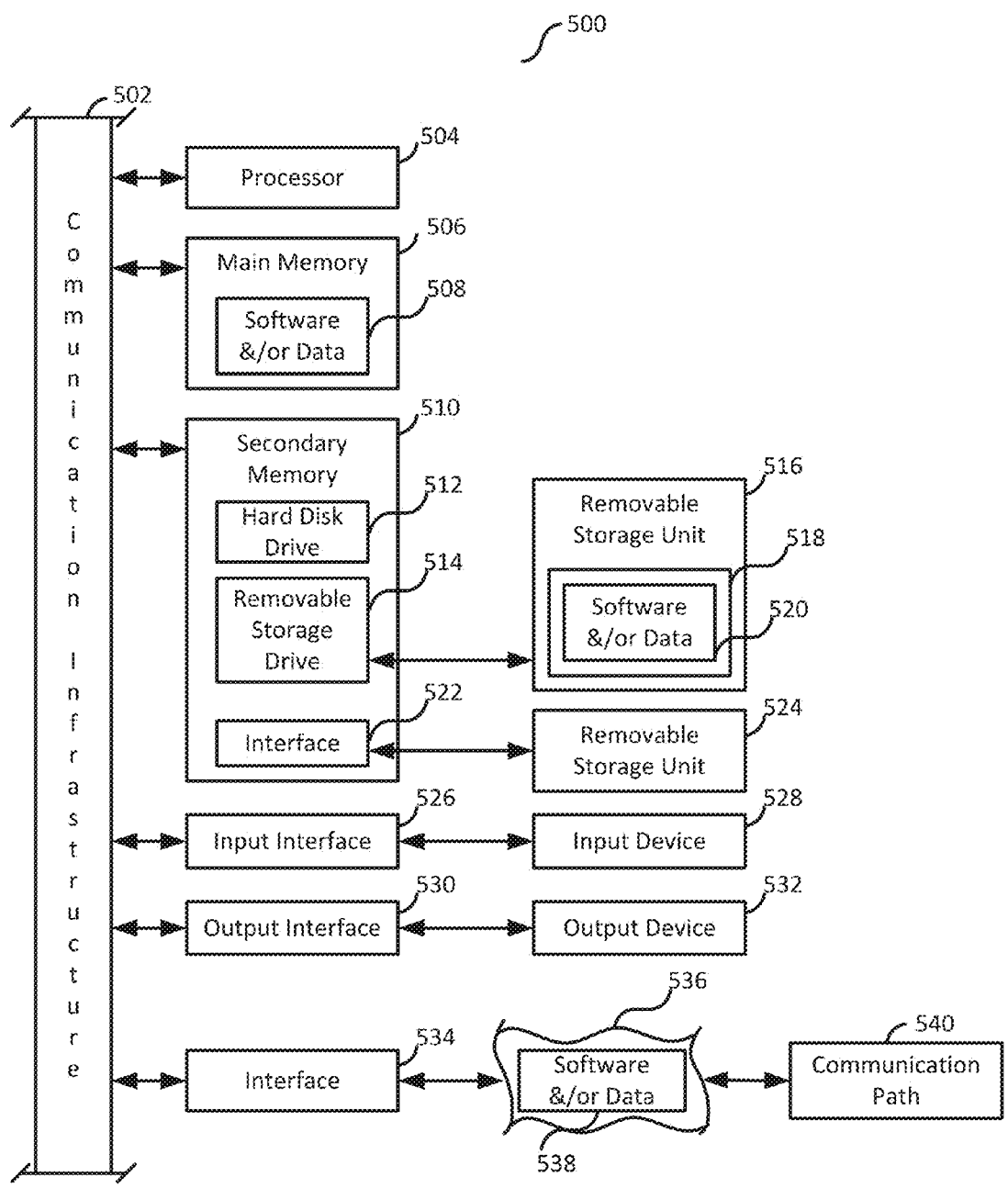
FIG. 5 is an example computer system in which one or more embodiments of the present disclosure may be implemented as computer-readable code.

Moreover, the principles described herein may apply to any computing device, such as the computing device described with respect to FIG. 5.

The captive portal server 140 may include a processor 142, a memory device 144, a first network interface 146, and a second network interface 148. The processor 142 and memory device 144 may be similar to the processor 112 and memory device 114 of the mobile device 110. The processor 142 may be coupled to the memory device 144 and the first and second network interfaces 146 and 148. The memory device 144 may include various software programs or instructions that may be executed by the processor 142 to facilitate the operation of a captive portal. The software programs or instructions may include, for example, a gateway 144.1, a dynamic host configuration protocol (DHCP) server 144.2, a domain name system (DNS) server 144.3, and a proxy server 144.4. The operations of the programs/instructions will be described in more detail below. The foregoing software programs may alternatively be implemented in stand-alone hardware or a combination of hardware and software. The first network interface 146 may be coupled to the WLAN 130 and the second network interface 148 may be coupled to the Internet 150.

The handover device/element 120 may be a NFC tag which may be read by the NFC device 118 of the mobile device 110. The NFC tag 120 may provide Wi-Fi login credentials to the mobile device 110, which may allow the mobile device 110 to automatically connect to the WLAN 130 without the manual entry of such credentials. This process is called "static NFC handover" and is explained in detail in the NFC Forum Connection Handover Technical Specification, Revision 1.2, the contents of which is incorporated herein by reference. Generally, the NFC tag 120 may be programmed to store NFC data exchange format (NDEF) tags that are compliant with the NFC Forum Connection Handover Technical Specification. The NDEF tags may include an NDEF Handover Request Message (HRM) (data records standardized by the NFC Forum) that may contain, among other information, a uniform resource indicator (URI) that may code the access data for the WLAN 130. The access data may be written to the NFC tag in the following format, for example: "wifi://ssid/open|wep|wpa/[key]." Any NFC mobile device compliant with the NFC connection handover standard may be able to connect to the WLAN 130 with a simple NFC tap. According to some embodiments, several different NFC tags 120 may be provided to account for differences in mobile device operating systems.

The handover device/element 120 may alternatively be a QR code, which may be read by a QR code scanning application installed on the mobile device 110 to obtain the Wi-Fi credentials of the WLAN 130. If the QR code scanning application implements an 'intent' for connecting the mobile device 110 to the WLAN 130 and if the QR code containing the WLAN 130 data is recognized by this QR code app, the app may be able to trigger the "intent" action (android) or connect to an "internal/custom URL scheme" (iOS) to launch the program in charge of connecting the device to the WLAN 130. According to further embodiments of the present disclosure, the handover device/element 120 may implement RFID technology, Wi-Fi, Bluetooth, or other suitable technologies to allow a connection handover with the mobile device 110.

Figure 2:
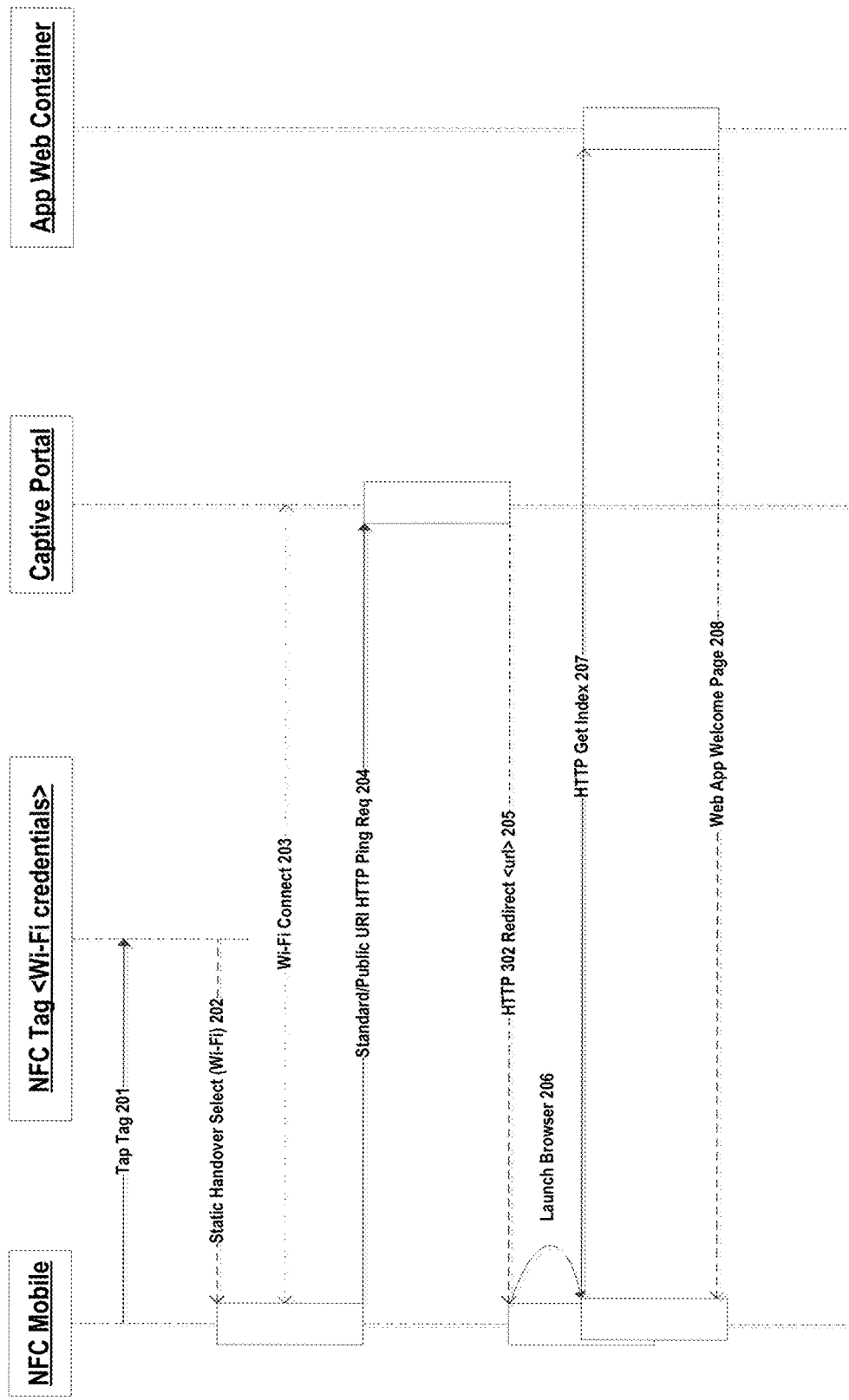
FIG. 2 is a timing diagram showing the operation of a system according to an embodiment of the present disclosure.

FIG. 2 is a sequencing diagram illustrating the operation of the system 100 in FIG. 1 (the sequencing diagram will be described with reference to the components of system 100 in FIG. 1). At step 201, a user of the mobile device 110 may tap the NFC tag 120 using his/her mobile device 110 (with a built in NFC device 118). The NFC tag(s) may be located in a retail store that the user is shopping at, for example. At step 202, the NFC device 118 may read the NDEF tags stored in the NFC tag 118. At step 203, the mobile device 110 may automatically connect to the WLAN 130 by implementing static NFC handover techniques described above. Once the mobile device 110 is connected to the WLAN 130, the device 110 may send a standard hypertext transfer protocol (HTTP) request ("standard/public URI HTTP ping request") to the WLAN 130 at step 204. On the mobile device 110 side, embodiments of the present disclosure may take advantage of a mechanism available in most smartphone operating systems. Each time a smart phone is connected to a WLAN (via a Wi-Fi access point) Android and iOS devices check a standard public URI to detect for a captive portal web browser on the mobile device 110.

The captive portal server 140, that can be implemented by a Hotspot Gateway (described in further detail below), may intercept the HTTP request and redirect the mobile device 110 to a local or remote portal page at step 205 using an HTTP 302 redirect mechanism ("HTTP 302 redirect <url>"). The redirect mechanism may block all outbound traffic to redirect any port 80 requests to a local or remote dedicated page. Usually, the portal page may deliver a page for authenticating the user. However, in accordance with the present disclosure, the redirect mechanism is configured to replace the authentication page with a mobile web hypertext markup language 5 (HTLM5) welcome page corresponding to a "transient mobile application" as desired by a service provide or retailer, for example. Once the mobile device 110 realizes that a captive portal is present, the device 110 may then automatically launch a web browser at step 206. At step 207, the mobile device may send an "HTTP Get Index" to an application web container and the "transient mobile application" may be automatically launched on the web browser of the mobile device 110 at step 208. The "transient application" may have an experience very close to a "downloaded" mobile application. While the user is within a restricted area (i.e., within the connection range of the WLAN 130), her/she may have access to the transient mobile application via the HTML5 page. Once the user leaves the restricted area, he/she will no longer be able to access the transient mobile application. The operation of the system 100 will be described in more detail with respect to FIGS. 2-4 below.

According to some embodiments of the present invention, the system 100 may implement a captive portal using techniques other than the HTTP 302 redirect mechanism. For example, the captive portal server 140 may implement a DNS rewrite or IP redirect mechanism to achieve the same goals.

The system 100 is especially useful for mobile applications designed for being used in a given place. For example, as described above, the system 100 may be used in a retail store. Users may be able to access a mobile shopping application without having to access an app store. Moreover, the user may be able to access the application without using his/her data connection because the system 100 utilizes a WLAN 130. Users could access the application during his/her stay at the retail store. The user may use the transient application in various ways. For example, he/she may use the application as a shopping assistant for getting coupons or information about items, performing payment and ordering, finding his/her location in the store, etc. At checkout time, the transient application could propose to the user to perform a permanent download of the application on the mobile device 110. If the user does not desire to do so, the application will not be downloaded on the device 110 once the user leaves the retail store.

The system 100 may also be implemented in various environments such as shopping centers, corporate campuses, college or university campuses, sports venues, train stations, airports, etc. The system 100 may also be used in a stadium to allow users to find seats, look up statistics, purchase goods, services, or food, etc. Moreover, the system 100 may allow service providers to inject advertising in the transient mobile application, such as coupons.

Moreover, the HTML5 transient mobile application may be packaged for being executed in Android WebViews on the mobile device 110. This may provide a rendering an user experience very close to applications that may be downloaded directly from an application store (e.g., Apple's App Store or Google Play).

Figure 3:
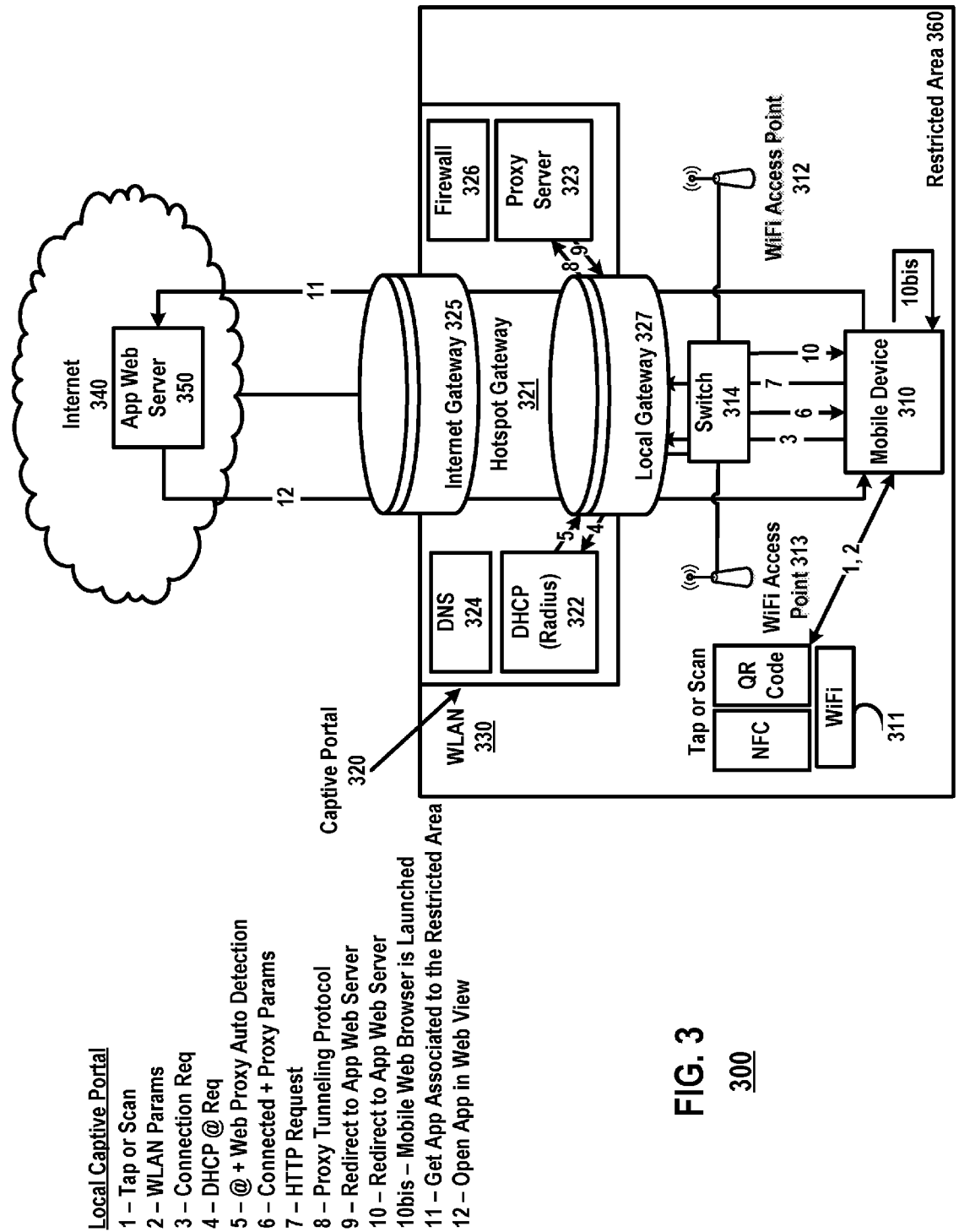
FIG. 3 is a block diagram of a local captive portal system according to an embodiment of the present disclosure.

FIG. 3 is a detailed diagram of a system 300 implementing a local captive portal according to an embodiment of the present disclosure. The system 300 may include a mobile device 310, a handover device 311, Wi-Fi access points 312, 313, a switch 314, a captive portal server 320, a WLAN 330, the Internet 340, and an application web server 350. The mobile device 310, the handover device 311, the Wi-Fi access points 312, 313, the WLAN 330, and the Internet 340 may be similar to the corresponding mobile device 110, the handover device 120, WLAN/Wi-Fi access point 130, and the Internet 150 of FIG. 1.

The captive portal server 320 may include a domain name service ("DNS") 324, an authentication server [radius] coupled with a DHCP server 322, a proxy server 323, a local gateway 327, and an internet gateway 325. The captive portal server 320 may be an internetworking device (e.g., a hotspot gateway 321) capable of allowing the mobile device 310 to transmit/receive data over the WLAN 330. The hotspot gateway 321 may implement authentication and authorization for the WLAN 330. The hotspot gateway 321 may also provide some routing/internet protocol (IP) address mapping functions to solve guest user connectivity problems when a user is attempting to access the Internet 340 despite the mobile device 310 configuration (e.g., DNS parameters and HTTP proxy settings recorded on the mobile device 310) which may differ from the WLAN 330 configuration. In order to authenticate and authorize the user, the hotspot gateway 321 may use an external module or can implement such a process itself. A standardized protocol called "Radius" may be used to implement such a process. According to embodiments of the present disclosure, the Radius protocol may allow any new customer to access a transient mobile application (described in further detail below). However, new customers may not be allowed to access the Internet 340 in general. At last, the hotspot gateway 321 may also provide a Firewall 326 that may be used to complete an Internet 340 access policy implemented by the service provider.

The DHCP server 322 may assign an IP address to the mobile device 310 to use on the WLAN 330 and provide the correct IP address for a transient mobile application to the mobile device 310. The proxy server 323 may intercept HTTP requests by the mobile device 310 and redirect the mobile device 310 to a transient mobile application as described below in more detail. In order to detect the proxy server 323, a Web Proxy Auto Detection (WPAD) flag may be returned and used by the mobile device 310. If the proxy 323 is unable to support the WPAD, an HTTP redirection code towards the proxy server 323 may be returned to the mobile device 310 at a first attempt to access a public URL. Thus, the mobile device 310 may be configured for using the proxy server 323 for all requests coming from the mobile device 310. Otherwise, if WPAD is not supported, for each HTTP request performed by the device 310, and HTTP 302 redirection code towards the proxy server 323 (viewed as a transparent proxy) may be delivered by the hotspot gateway 321. This process may be entirely transparent to a user of the mobile device 310.

The switch 314 may be a multi-port network bridge that may route data between the mobile device 310 and the captive portal server 320 via the local gateway device 327. An internet gateway 325 may be a internetworking device capable of allowing data to be transmitted/received between the captive portal server 320 and the application web server 350.

The application web server 350 may be managed by a service provider or retailer and may host a transient mobile application which may be accessed by a user via the mobile device 310. The server 350 may include components not shown in FIG. 300 for purposes of simplicity, such as a processor (or multiple processors), a memory device (or multiple memory devices), a network interface (or multiple network interfaces), etc.

During operation, a user may tap the mobile device 310 on the handover device 311, such as an NFC tag for example in step 1. If the handover device is a QR code, the user may scan the QR code using his/her mobile device 310. As described above, the mobile device 310 may then obtain the WLAN 330 parameters (e.g., the network ID and a security key) using the static NFC handover techniques described above in step 2. After obtaining the WLAN 330 parameters, the mobile device 310 may send a connection request to the hotspot gateway 321 at step 3 (via the switch 314 and the local gateway device 327). At step 4, the hotspot gateway 321 may send a DHCP request to the DHCP server 322 to obtain an IP address to assign to the mobile device 310. At step 5, the DHCP server 322 may provide an IP address to the hotspot gateway 321, which may then assign the IP address to the mobile device 310 and also provide proxy parameters to the mobile device 310 at step 6.

At step 7, the mobile device 310 may subsequently send an HTTP request to the hotspot gateway 321 as described above with respect to FIG. 2. For example, embodiments of the present disclosure may take advantage of a mechanism available in most smartphone operating systems. Each time a smart phone is connected to a WLAN (via a Wi-Fi access point) Android and iOS devices check a standard public URI to detect for a captive portal web browser on the mobile device 310. At step 8, the hotspot gateway 321 may redirect the HTTP request from the mobile device 310 to the proxy server 323, which may transmit redirect instruction and data to the hotspot gateway 321 at step 9. In turn, the hotspot gateway 321 may respond to the HTTP request from the mobile device (at step 7) and redirect the mobile device to a URL of a transient mobile application hosted by the application web server 350 at step 10. This may be accomplished by implementing an HTTP 302 redirect mechanism as described above.

As describe above, the mobile device 310 may recognize that a captive portal is present after being redirected by the proxy server 323 and automatically launch a web browser at step 10*bis*. If the mobile device 310 does not support the "automatic web browser launch" feature, the following steps may occur once the user of the mobile device 310 manually opens up a web browser application. At step 11, the mobile device 310 may communicate with the application web server 350 via the Internet 340 in response to the HTTP redirect mechanism to gain access to the transient mobile application. At step 12, the application web server 350 may allow the mobile device 310 to open the transient mobile application in the web browser.

According to some embodiments of the present invention, the system 300 may implement a captive portal using techniques other than the HTTP 302 redirect mechanism. For example, the captive portal server 320 may implement a DNS rewrite or IP redirect mechanism to achieve the same goals.

A user of the mobile device 310 may have access to the transient mobile application while in the "restricted area"

360. The user may be able to access the application without using his/her data connection because the system 300 utilizes a WLAN 330. Users could access the application during their stay at the retail store. The user may use the transient application in various ways. For example, he/she may use the application as a shopping assistant for getting coupons or information about items, performing payment and ordering, finding his/her location in the store, etc. At checkout time, the transient application could propose to the user to perform a permanent download of the application on the mobile device 310. If the user does not desire to do so, the application will not be downloaded on the device 310 once the user leaves the retail store.

The system 300 may also be implemented in various environments such as shopping centers, corporate campuses, college or university campuses, sports venues, train stations, airports, etc. Moreover, the system 300 may allow service providers to inject advertising in the transient mobile application, such as coupons.

Figure 4:
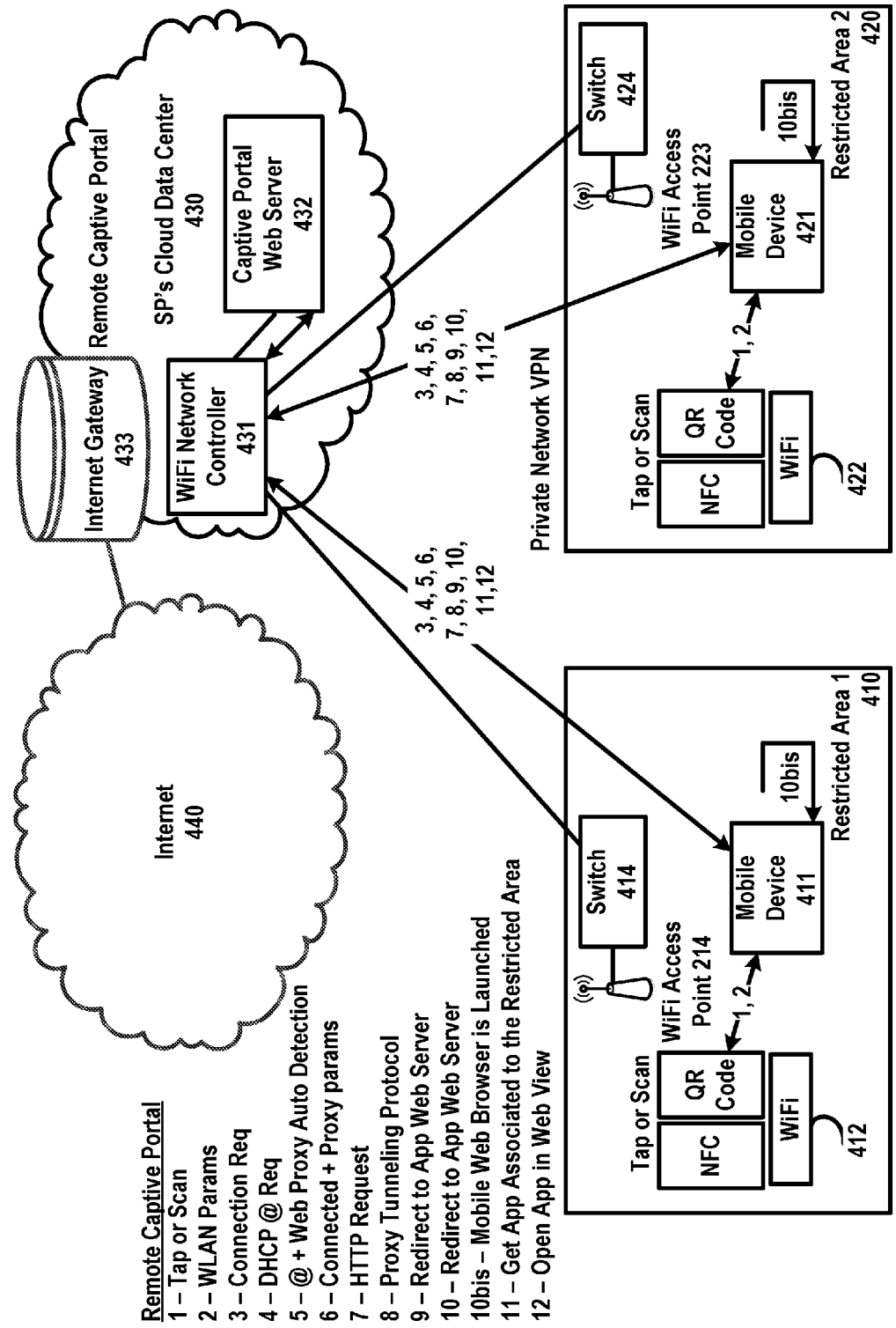
FIG. 4 is a block diagram of a remote captive portal system according to an embodiment of the present disclosure.

FIG. 4 is a detailed diagram of a system 400 implementing a remote captive portal according to an embodiment of the present disclosure. The system 400 may be similar to system 300 of FIG. 3, but the captive portal server 432 may be hosted on a service provider's cloud data center 430 as opposed to the local captive portal server 320 in FIG. 3. The system 400 may include a plurality of restricted areas 410 and 420, for example, a service provider's cloud data center 430, and the Internet 440. In this embodiment, there may be two separate corresponding mobile devices, 411 and 421, respectively, may be able to access a transient mobile application in different restricted areas 410 and 420.

The cloud data center 430 may include a Wi-Fi network controller 431, a captive portal web server 432, and an internet gateway 433. The Wi-Fi network controller 431 may operate in a similar fashion to the combination of the hotspot gateway 321, DNS server 322, and the proxy server 323 in FIG. 3. Indeed, the network controller 431 may include these devices/modules (although this is not shown in FIG. 4 for simplicity purposes). The network controller 431 may be able to define different (private) sub-networks (e.g., mask, IP addresses, DNS, etc.) for each WLAN 413 and 423 and manage redirections independently for each restricted area 410 and 420 respectively. In this manner, each restricted area 410 and 420 may be assigned to its own related transient mobile application (or the same if desired by the service provider). The captive portal web server 432 may operate in a similar fashion to the application web server 350 in FIG. 3.

During operation, a user may tap his/her mobile device (411 or 421) on the handover device (412 or 422), such as an NFC tag for example in step 1. If the handover device is a QR code, the user may scan the QR code using his/her mobile device. The mobile device (411 or 421) may then obtain the WLAN 413 or 423 parameters to connect to a virtual private network (VPN) (e.g., the network ID and a security key) using the static NFC handover techniques described above in step 2. After obtaining the VPN parameters, the mobile device (411 or 421) may send a connection request to the Wi-Fi network controller 431 at step 3. At step 4, the Wi-Fi network controller 431 may obtain an IP address to assign to the mobile device (411 or 421). At step 5, the Wi-Fi network controller 431 may then assign the IP address to the mobile device (411 or 421) and also provide proxy parameters to the mobile device (411 and 421) at step 6.

At step 7, the mobile device (411 or 421) may subsequently send an HTTP request to the Wi-Fi network controller 431 as described above with respect to FIG. 2. For example, embodiments of the present disclosure may take advantage of a mechanism available in most smartphone operating systems. Each time a smart phone is connected to the VPN network (via a Wi-Fi access points 413 or 424) Android and iOS devices check a standard public URI to detect for a captive portal web browser on the mobile device (411 or 421). At step 8, the Wi-Fi network controller 431 may redirect the HTTP request from the mobile device (411 or 421) to a proxy server (not shown, but similar to proxy server 323 of FIG. 3), which may transmit redirect instructions and data to the Wi-Fi network controller 431 at step 9. In turn, the Wi-Fi network controller 431 may respond to the HTTP request from the mobile device (411 or 421) (at step 7) and redirect the mobile device (411 or 421) to a URL of a transient mobile application hosted by the captive portal web server 432 at step 10. This may be accomplished by implementing an HTTP 302 redirect mechanism as described above.

As describe above, the mobile device (411 or 421) may recognize that captive portal is present after being redirected by the Wi-Fi network controller 431 and automatically launch a web browser at step 10*bis*. If the mobile device (411 or 421) does not support the "automatic web browser launch" feature, the following steps may occur once the user of the mobile device (411 or 421) manually opens up a web browser application. At step 11, the mobile device (411 or 421) may communicate with the web server 432 via the Internet 440 in response to the HTTP redirect mechanism to gain access to the transient mobile application. At step 12, the web server 432 may allow the mobile device (411 or 421) to open the transient mobile application in the web browser.

According to some embodiments of the present invention, the system 400 may implement a captive portal using techniques other than the HTTP 302 redirect mechanism. For example, the Wi-Fi network controller 431 and the captive portal web server 432 may implement a DNS rewrite or IP redirect mechanism to achieve the same goals.

Users of the mobile devices 411 and 421 may have access to the transient mobile application while in the "restricted areas" 410 and 420. Moreover, the transient mobile applications accessed by the devices 411 and 421 may be the same application or two different applications. The user may be able to access the application without using his/her data connection because the system 400 utilizes a Wi-Fi connection. Users could access the application during their stay at a retail store, for example. The user may use the transient application in various ways. For example, he/she may use the application as a shopping assistant for getting coupons or information about items, performing payment and ordering, finding his/her location in the store, etc. At checkout time, the transient application could propose to the user to perform a permanent download of the application on the mobile device (421 or 422). If the user does not desire to do so, the application will not be downloaded on the device (421 or 422) once the user leaves the retail store.

The system 400 may also be implemented in various environments such as shopping centers, corporate campuses, college or university campuses, sports venues, train stations, airports, etc. Moreover, the system 400 may allow service providers to inject advertising in the transient mobile application, such as coupons.

Aspects of the above may be implemented by software, firmware, hardware, or any combination thereof. FIG. 5 illustrates an example computer system 500 in which the above, or portions thereof, may be implemented as computer-readable code. Various embodiments of the above are described in terms of this example computer system 500.

Computer system 500 includes one or more processors, such as processor 504. Processor 504 can be a special purpose processor or a general purpose processor. Processor 504 is connected to a communication infrastructure 502 (for example, a bus or a network).

Computer system 500 also includes a main memory 506, preferably Random Access Memory (RAM), containing possibly inter alia computer software and/or data 508.

Computer system 500 may also include a secondary memory 510. Secondary memory 510 may include, for example, a hard disk drive 512, a removable storage drive 514, a memory stick, etc. A removable storage drive 514 may comprise a floppy disk drive, a magnetic tape drive, an optical disk drive, a flash memory, or the like. A removable storage drive 514 reads from and/or writes to a removable storage unit 516 in a well-known manner. A removable storage unit 516 may comprise a floppy disk, magnetic tape, optical disk, etc. which is read by and written to by removable storage drive 514. As will be appreciated by persons skilled in the relevant art(s) removable storage unit 516 includes a computer usable storage medium 518 having stored therein possibly inter alia computer software and/or data 520.

In alternative implementations, secondary memory 510 may include other similar means for allowing computer programs or other instructions to be loaded into computer system 500. Such means may include, for example, a removable storage unit 524 and an interface 522. Examples of such means may include a program cartridge and cartridge interface (such as that found in video game devices), a removable memory chip (such as an Erasable Programmable Read-Only Memory (EPROM), or Programmable Read-Only Memory (PROM)) and associated socket, and other removable storage units 524 and interfaces 522 which allow software and data to be transferred from the removable storage unit 524 to computer system 500.

Computer system 500 may also include an input interface 526 and a range of input devices 528 such as, possibly inter alia, a keyboard, a mouse, etc.

Computer system 500 may also include an output interface 530 and a range of output devices 532 such as, possibly inter alia, a display, one or more speakers, etc.

Computer system 500 may also include a communications interface 534. Communications interface 534 allows software and/or data 538 to be transferred between computer system 500 and external devices. Communications interface 534 may include a modem, a network interface (such as an Ethernet card), a communications port, a Personal Computer Memory Card International Association (PCMCIA) slot and card, or the like. Software and/or data 538 transferred via communications interface 534 are in the form of signals 536 which may be electronic, electromagnetic, optical, or other signals capable of being received by communications interface 534. These signals 536 are provided to communications interface 534 via a communications path 540. Communications path 540 carries signals and may be implemented using wire or cable, fiber optics, a phone line, a cellular phone link, a Radio Frequency (RF) link or other communications channels.

As used in this document, the terms "computer program medium," "computer usable medium," and "computer readable medium" generally refer to media such as removable storage unit 516, removable storage unit 524, and a hard disk installed in hard disk drive 512. Signals carried over communications path 540 can also embody the logic described herein. Computer program medium and computer usable medium can also refer to memories, such as main memory 506 and secondary memory 510, which can be memory semiconductors (e.g. Dynamic Random Access Memory (DRAM) elements, etc.). These computer program products are means for providing software to computer system 500.

Computer programs (also called computer control logic) are stored in main memory 506 and/or secondary memory 510. Computer programs may also be received via communications interface 534. Such computer programs, when executed, enable computer system 500 to implement the present disclosure as discussed herein. In particular, the computer programs, when executed, enable processor 504 to implement the processes of aspects of the above. Accordingly, such computer programs represent controllers of the computer system 500. Where the disclosure is implemented using software, the software may be stored in a computer program product and loaded into computer system 500 using removable storage drive 514, interface 522, hard drive 512 or communications interface 534.

The disclosure is also directed to computer program products comprising software stored on any computer useable medium. Such software, when executed in one or more data processing devices, causes data processing device(s) to operate as described herein. Embodiments of the disclosure employ any computer useable or readable medium, known now or in the future.

Examples of computer readable storage media include, but are not limited to: primary and/or secondary devices, magnetic media, such as hard disks, floppy disks, Zip disks, tapes, and magnetic tape; optical media such as Compact Disc Read-Only Memory (CD-ROM) disks, DVDs and holographic devices; magneto-optical media; and hardware devices that are specially configured to store and execute, such as application-specific integrated circuits ("ASICs"), programmable logic devices ("PLDs") and ROM and RAM devices, Microelectromechanical Systems (MEMS), nano-technological storage device, etc.), and communication mediums (e.g., wired and wireless communications networks, local area networks, wide area networks, intranets, etc.). Examples of computer readable instructions include machine code, such as produced by a compiler, and files containing higher-level code that are executed by a computer using an interpreter. For example, an embodiment of the disclosure may be implemented using Java, C++, or other object-oriented programming language and development tools. Another embodiment of the disclosure may be implemented in hard-wired circuitry in place of, or in combination with machine readable software instructions.

It is important to note that the particulars of FIG. 5 (such as for example the specific components that are presented, the component arrangement that is depicted, etc.) are illustrative only and it will be readily apparent to one of ordinary skill in the relevant art that numerous alternatives (including inter alia other or different components, alternative arrangements, etc.) are easily possible.

In the above description, numerous specific details are set forth to provide a thorough understanding of embodiments of the disclosure. One skilled in the relevant art will recognize, however, that the various embodiments can be practiced without one or more of the specific details or with other methods, components, techniques, etc. In other instances, well-known operations or structures are not shown or described in detail to avoid obscuring aspects of the disclosure.

Although the processes illustrated and described herein include series of steps, it will be appreciated that the different embodiments of the present disclosure are not limited by the illustrated ordering of steps, as some steps may occur in different orders, some concurrently with other steps apart from that shown and described herein. In addition, not all illustrated steps may be required to implement a methodology in accordance with the present disclosure. Moreover, it will be appreciated that the processes may be implemented in association with the apparatus and systems illustrated and described herein as well as in association with other systems not illustrated.

The above descriptions and illustrations of embodiments of the disclosure, including what is described in the Abstract, is not intended to be exhaustive or to limit the embodiments to the precise forms disclosed. While specific embodiments of, and examples for, the embodiments are described herein for illustrative purposes, various equivalent modifications are possible within the scope of the disclosure, as those skilled in the relevant art will recognize. These modifications can be made to the embodiments in light of the above detailed description.

We claim:

1. A system comprising:
a mobile device;
a near field communication (NFC) tag to store wireless local area network (WLAN) login credentials and transmit the login credentials to the mobile device using a static connection handover protocol, wherein:
the mobile device is adapted to automatically connect to the WLAN after receiving the login credentials; and
the mobile device checks a standard public uniform resource locater (URL) to detect the presence of a captive portal;
a captive portal server to authorize and authenticate the mobile device and to connect the mobile device to the captive portal, wherein the captive portal server is a hotspot gateway comprising a dynamic host configuration protocol (DHCP) server, a domain name service (DNS), and a proxy server; and
an application server to host a hypertext-markup language 5 (HTML5) transient mobile application, wherein
after the mobile device is connected to the network and the captive portal, the captive portal server to redirect the mobile device to an address of the transient mobile application using a hypertext transfer protocol (HTTP) 302 redirect mechanism;
the mobile device is adapted to automatically launch a web browser application after being redirected by the captive portal server;
the transient mobile application cannot be accessed outside a restricted area associated with the network; and
the HTML5 transient mobile application is packaged for being executed in Web Views on the mobile device.

2. The system of claim 1, wherein the captive portal is a local captive portal.

3. The system of claim 1, wherein the captive portal is a remote captive portal.

4. The system of claim 1, wherein a user of the mobile device is prompted to download a permanent version of the transient mobile application prior to leaving the restricted area for use outside of the restricted area.

5. A method comprising:
interacting with a near field communication (NFC) tag using a mobile device;
storing wireless local area network (WLAN) login credentials using the NFC tag;
transmitting the login credentials to the mobile device using a static connection handover protocol, wherein:
the mobile device is adapted to automatically connect to the WLAN after receiving the login credentials; and
the mobile device checks a standard public uniform resource locater (URL) to detect the presence of a captive portal;
authorizing and authenticating, via a captive portal server, the mobile device and to connect the mobile device to the captive portal, wherein the captive portal server is a hotspot gateway comprising a dynamic host configuration protocol (DHCP) server, a domain name service (DNS), and a proxy server; and
hosting, via an application server, a hypertext-markup language 5 (HTML5) transient mobile application, wherein:
after the mobile device is connected to the network and the captive portal, the captive portal server to redirect the mobile device to an address of the transient mobile application using a hypertext transfer protocol (HTTP) 302 redirect mechanism;
the mobile device is adapted to automatically launch a web browser application after being redirected by the captive portal server;
the transient mobile application cannot be accessed outside a restricted area associated with the network; and
the HTML5 transient mobile application is packaged for being executed in Web Views on the mobile device.

6. The method of claim 5, wherein the captive portal is a local captive portal.

7. The method of claim 6, wherein the captive portal is a remote captive portal.

8. The method of claim 5, wherein a user of the mobile device is prompted to download a permanent version of the transient mobile application prior to leaving the restricted area for use outside of the restricted area.

9. A non-transitory computer programmable product having storing instructions, which when executed by at least one data processor, result in operations comprising:
interacting with a near field communication (NFC) tag using a mobile device;
storing wireless local area network (WLAN) login credentials using the NFC tag;
transmitting the login credentials to the mobile device using a static connection handover protocol, wherein:
the mobile device is adapted to automatically connect to the WLAN after receiving the login credentials; and
the mobile device checks a standard public uniform resource locater (URL) to detect the presence of a captive portal;
authorizing and authenticating, via a captive portal server, the mobile device and to connect the mobile device to the captive portal, wherein the captive portal server is a hotspot gateway comprising a dynamic host configuration protocol (DHCP) server, a domain name service (DNS), and a proxy server; and
hosting, via an application server, a hypertext-markup language 5 (HTML5) transient mobile application, wherein:
after the mobile device is connected to the network and the captive portal, the captive portal server to redirect the mobile device to an address of the transient mobile application using a hypertext transfer protocol (HTTP) 302 redirect mechanism;
the mobile device is adapted to automatically launch a web browser application after being redirected by the captive portal server;
the transient mobile application cannot be accessed outside a restricted area associated with the network; and the HTML5 transient mobile application is packaged for being executed in Web Views on the mobile device.

10. The non-transitory computer programmable product of claim 9, wherein the captive portal is a local captive portal.

11. The non-transitory computer programmable product of claim 9, wherein the captive portal is a remote captive portal.

12. The non-transitory computer programmable product of claim 9, wherein a user of the mobile device is prompted to download a permanent version of the transient mobile application prior to leaving the restricted area for use outside of the restricted area.

\* \* \* \* \*